United States Patent [19]
Todd

[11] Patent Number: 5,971,764
[45] Date of Patent: Oct. 26, 1999

[54] EDUCATIONAL SAND AND WATER TABLE

[75] Inventor: Mary Y. Todd, Beaufort, S.C.

[73] Assignee: Environments, Inc., Beaufort, S.C.

[21] Appl. No.: 08/964,844

[22] Filed: Nov. 5, 1997

[51] Int. Cl.⁶ .................................................. G09B 25/08
[52] U.S. Cl. .......................... 434/126; 434/130; 434/151
[58] Field of Search .................................... 434/126, 130, 434/150, 151, 152, 299; 220/376, 571, 571.1

[56] References Cited

U.S. PATENT DOCUMENTS

| 339,741 | 4/1886 | Clough . |
| 646,582 | 4/1900 | Murche ................................... 434/152 |
| 1,018,373 | 2/1912 | Robbins . |
| 3,673,705 | 7/1972 | Wright et al. . |
| 3,827,290 | 8/1974 | Carlson . |
| 3,913,393 | 10/1975 | Facy ..................................... 434/126 X |
| 4,056,892 | 11/1977 | Atencio ................................... 434/151 |
| 4,057,244 | 11/1977 | Gaspar . |
| 4,346,885 | 8/1982 | Mathou . |
| 4,371,995 | 2/1983 | Donhauser .................................. 4/538 |
| 4,515,360 | 5/1985 | Mariol . |
| 4,685,884 | 8/1987 | Rohan ..................................... 434/152 |
| 4,733,790 | 3/1988 | Stein ................................... 220/571 X |
| 4,901,997 | 2/1990 | Varga . |
| 4,901,998 | 2/1990 | Griffith . |
| 5,277,585 | 1/1994 | Aminighazvini ........................ 434/126 |
| 5,291,921 | 3/1994 | Devine ............................... 220/571 X |
| 5,427,530 | 6/1995 | Taggart ............................... 434/151 X |
| 5,577,539 | 11/1996 | Shaw et al. .......................... 220/571 X |

FOREIGN PATENT DOCUMENTS

| 2008594 | 1/1970 | France .................................... 434/152 |
| 2263610 | 7/1974 | Germany ............................... 434/152 |

Primary Examiner—John A. Ricci
Attorney, Agent, or Firm—Peter Tu; Weil, Gotshal & Manges LLP

[57] ABSTRACT

The invention comprises a container having sidewalls and a bottom; a rigid cover having integrally molded or detachable features simulating natural or manmade topographical features such as riverbeds, mountains, islands, whirlpools, and various rock and stone shapes. In accordance with the invention, the cover is detachably secured to the sidewalls of the container.

19 Claims, 5 Drawing Sheets

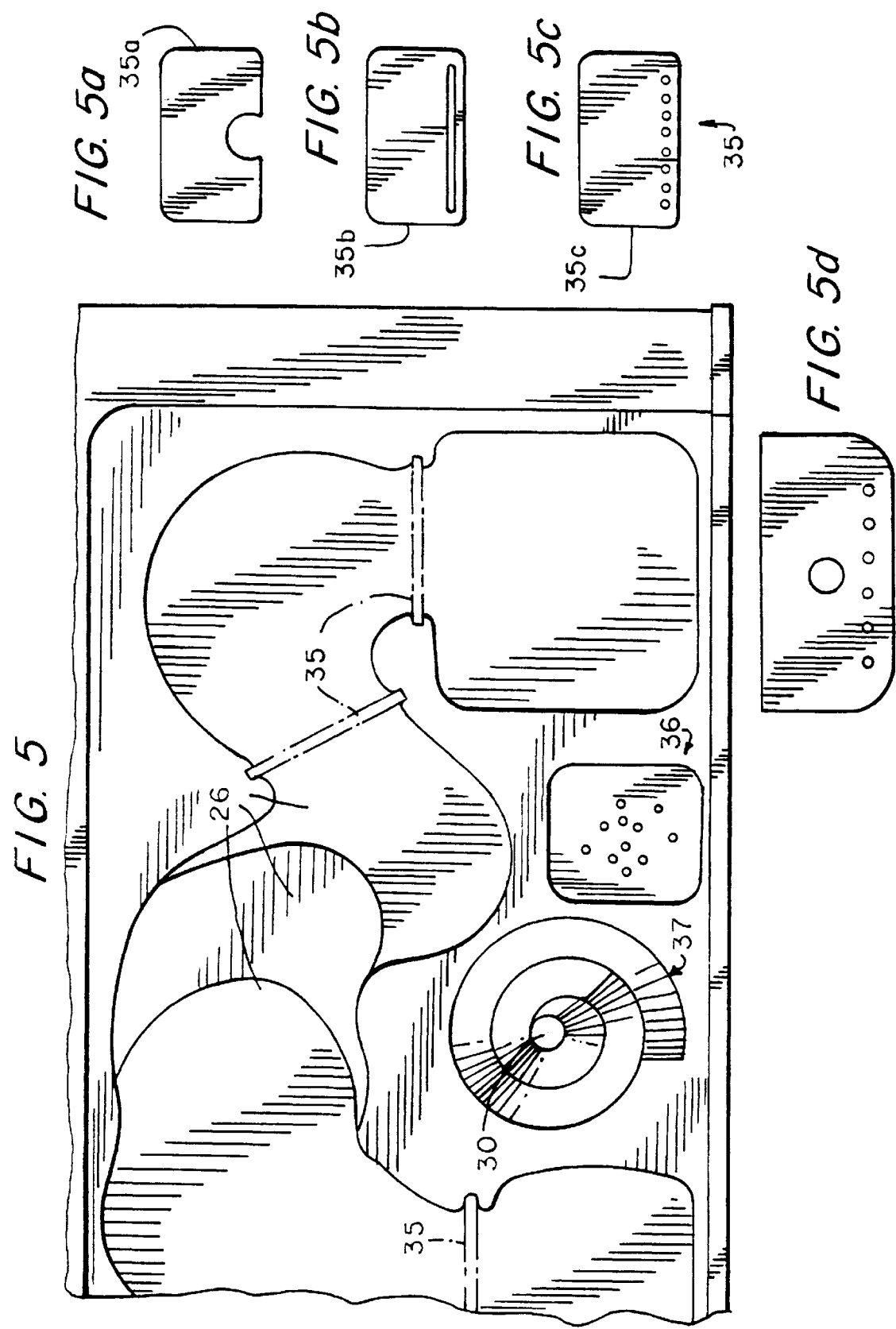

EDUCATIONAL SAND AND WATER TABLE

BACKGROUND OF THE INVENTION

This invention relates to a sand and water table to be used as an educational product for early childhood schools and learning centers.

It is well known that conventional teaching by means of lecture and forced rote memorization has limited effectiveness, especially for young children. One major drawback of the conventional lecture approach is that it does not allow for individual differences in learning styles and in rates of learning. In addition, such teaching methods fail to foster a love for learning and do not encourage young students to learn on their own. Overcoming the shortcomings of conventional teaching methods is an age-old problem.

On solution is to provide students with hands-on, self-directed, experiential educational activities that, in contrast to conventional teaching methods, do promote a child's innate curiosity and foster independent learning. It is important that such activities not only impart knowledge but also be fun and interesting so that children will choose to learn rather than be forced to learn.

It also is well known that children, young and old, enjoy playing with water, sand and the like. Hence, activities involving water and sand can provide ideal "learn through play" experiences, allowing children to explore by following their natural desires and interests. Shaping sand and pouring water allows self-expression and experimentation without fear of mistakes. In addition, the child is afforded the opportunity to direct and construct his or her own learning in a manner dictated only by the child's imagination and desires. In this way, water and sand play provides the child with a sense of being in control. Water and sand play also provides an excellent opportunity for young children to play together, promoting their ability to work together and to learn from each others' experiences.

Furthermore, through the fun and fascination of manipulating and experimenting with real materials, children make basic discoveries that deepen their understanding of natural science concepts and of the world around them. For example, by experiencing the movement of water and floating objects, children discover that the amount and force of water affect its movement. Children also learn about gravity through observing the natural downward flow of water, and about erosion from watching water steadily wash away sand. Moreover, water and sand play encompasses multiple senses, language skills, math and science concepts, problem-solving skills, social development, and creative expression.

It is therefore desirable to develop a piece of equipment that would simulate the natural environment and provide for a variety of experiences with water, thereby teaching children about the properties of sand, water and water flow. It is further desirable that such an apparatus be in the form of a cover easily attachable to, and detachable from, an existing sand and water table.

It is therefore one objective of the present invention to provide a sand and water table with a cover that includes topographical features such as hills, bends, depressions, ripples and the like. It is another object of the invention that said cover easily attaches to, and detaches from, the sand and water table. Other objectives, features and advantages of the invention will become apparent from the subsequent description and the appended claims.

SUMMARY OF THE INVENTION

In accordance with the present invention, there is provided a novel and useful educational sand and water table. The invention includes a container having sidewalls and a bottom; a rigid cover having integrally molded features simulating the natural topographical features such as riverbeds, mountains, islands, whirlpools, and various rock and stone shapes; and a means for securing the cover to the sidewalls of the container. Optionally, the invention also may include a filling tank to prevent overflow and splash-back; an overflow basin to allow water to accumulate; a series of outflow holes to allow water to drain into the container below; and a backsloped overflow channel to prevent overflow.

DESCRIPTION OF THE DRAWINGS

FIG. 5 provides a top plan view of one embodiment of the cover and side views of a topographical feature.

DETAILED DESCRIPTION OF PREFERRED EMBODIMENTS

Figure 1:
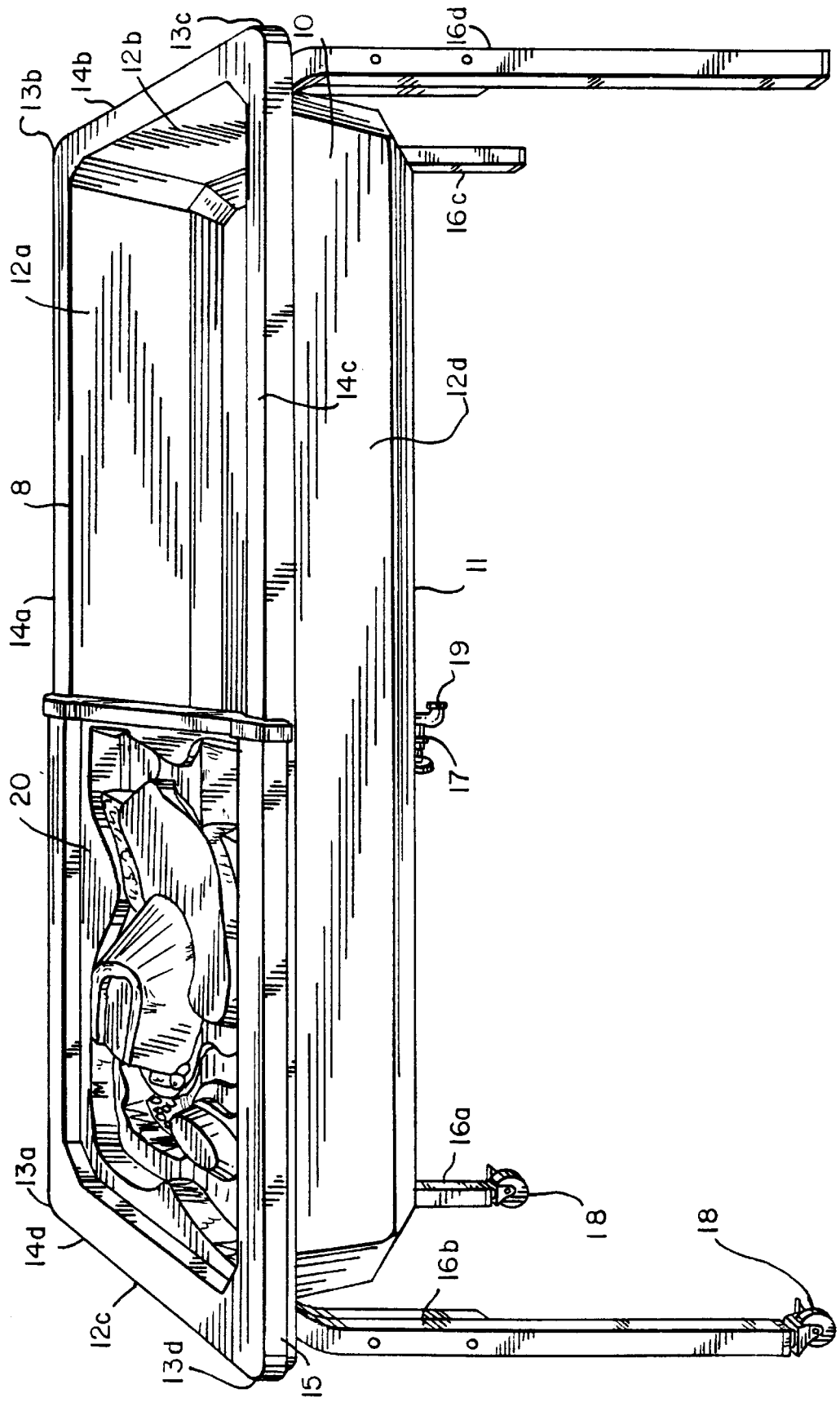
FIG. 1 is a side view of an educational sand and water table made in accordance with the teachings of this invention.
Figure 2:
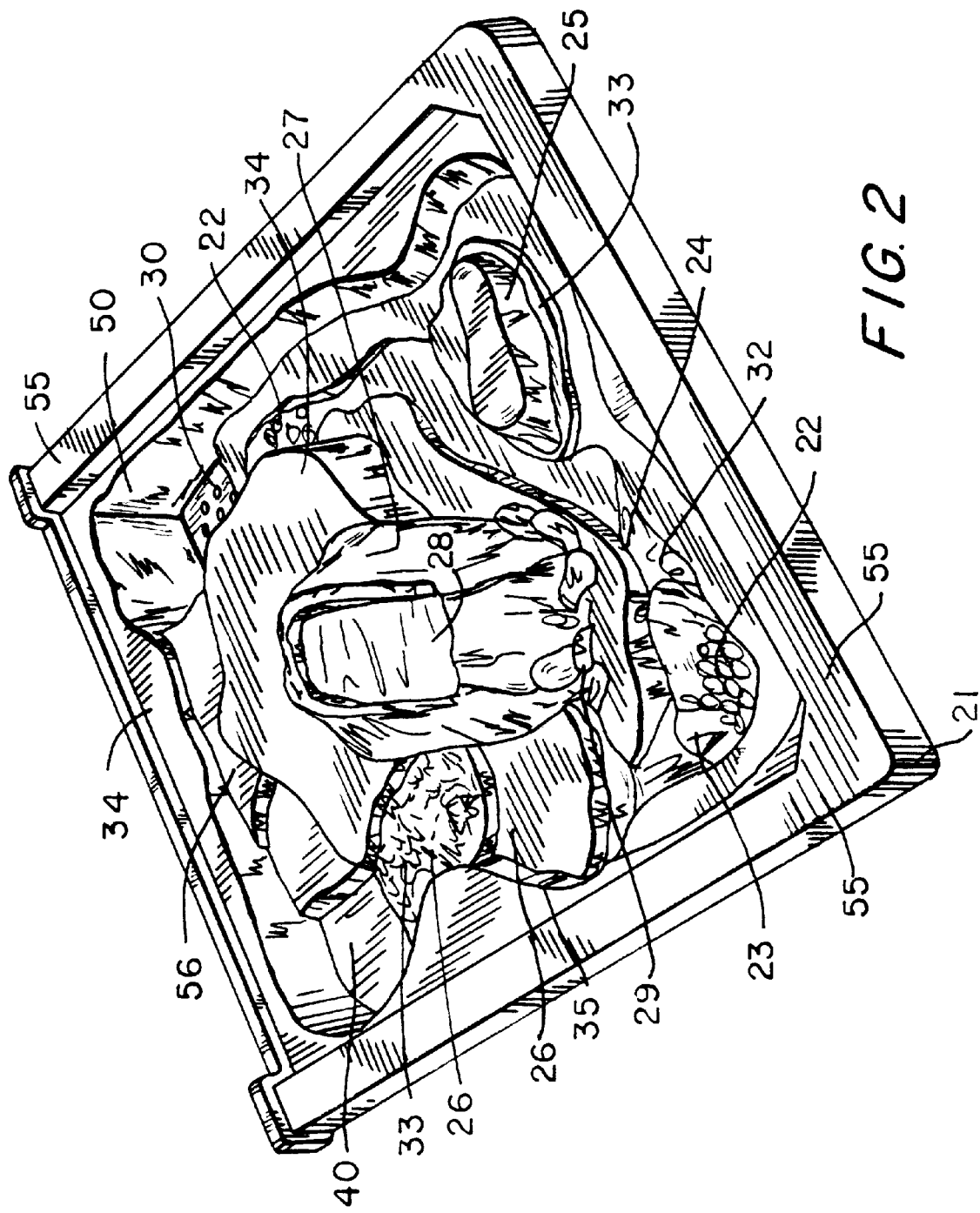
FIG. 2 is a top-plan view of one embodiment of the cover for the educational sand and water table.
Figure 3C:
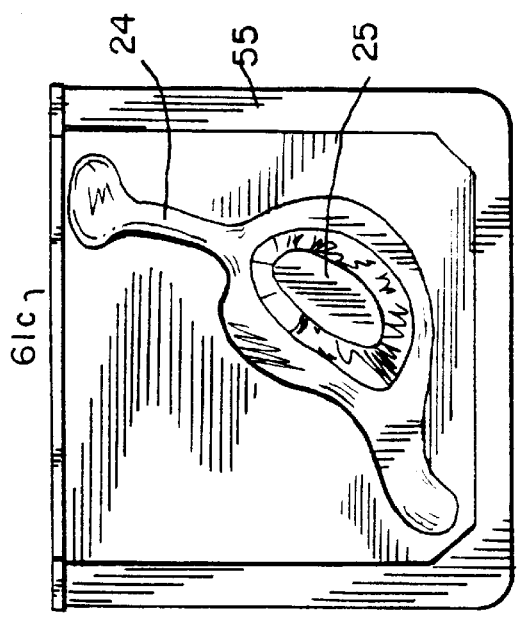
FIG. 3 is a top-plan view of alternative embodiments of the cover.
Figure 3D:
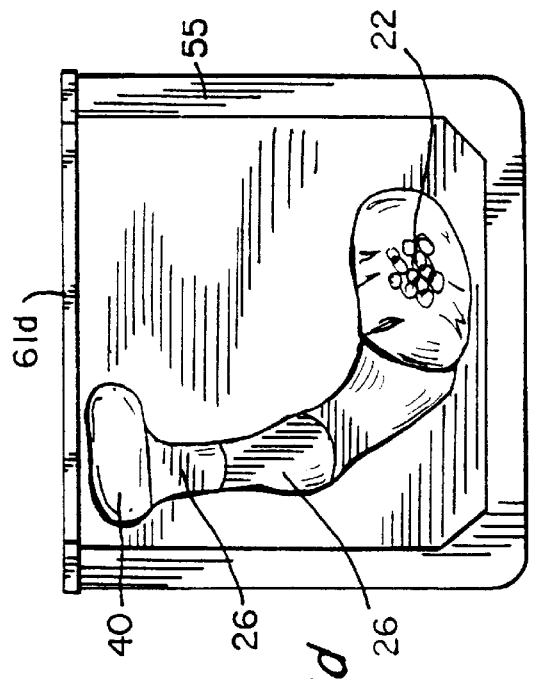
Figure 3A:
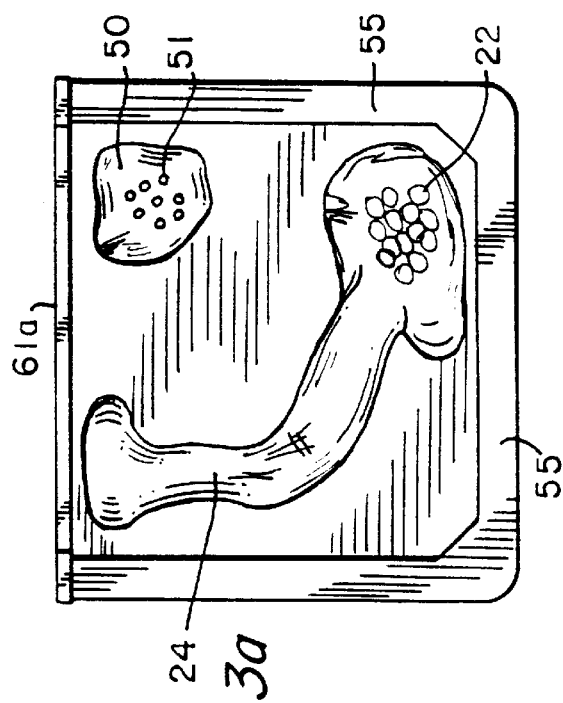
Figure 3B:
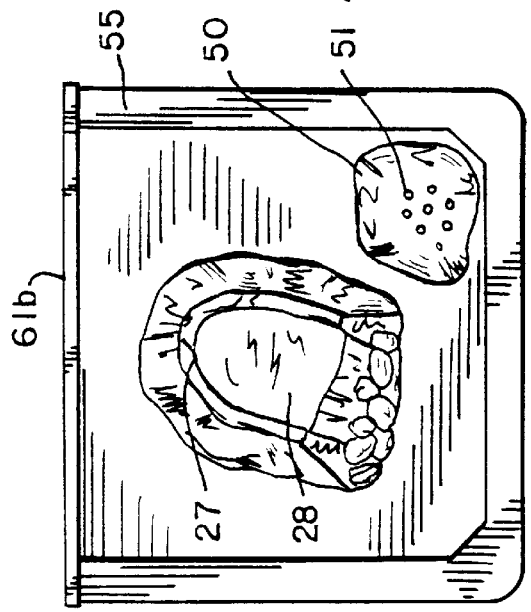

Referring to FIGS. 1 and 2, one embodiment of a sand and water table made according to this invention has a container 10 for containing sand and water, and a cover 20 attachable to the container. The container 10 has a relatively flat bottom 11 and substantially vertical upright interior sidewalls 12a–d. Extending from underneath the container are a supporting understructure or frame 15 and four frame legs 16a–d, which also can serve as handles for moving the sand and water table. Locking casters 18 on two legs provide easy mobility, yet keep the table securely in place when children are playing.

In a preferred embodiment, the container is made from a single-piece molding of tough ABS plastic with uniform thickness for maximum strength and durability. Rounded corners 13a–d and edges 14a–d provide for enhanced strength and safety. Preferably, the frame 15 and legs 16a–d should be made from rust-resistant, enamel coated 1" square steel tubing. A drain 17 with faucet handle 19 located underneath the container 10 allows for convenient emptying and clean-up.

One means for securing the cover 20 to the sidewalls 12a–d is by providing a lip 8 on each sidewall 12a–d and a channel 21 integrally formed along three outer edges of the cover 20 such that the channel 21 securely but detachably engages the lip 8 on three sidewalls. The cover should preferably be easily detachable from the container.

In such an embodiment, the cover 20 should preferably be of a size that would leave exposed an opening to provide access to the sand and water in the container. The cover 20 also can be made from a single-piece molded ABS plastic.

Integrally molded on the surface of the cover 20 are several unique topographical features that introduce natural science concepts through hands-on experiences and stimulate conceptual learning. First, certain rock-like shapes 22 are formed on the surface of the cover 20 and placed in such a way as to create a whirlpool effect as the water passes through this area 23.

Second, a sloping riverbed 24, with a step-like region 26 and a gully 32, simulates the natural movement of water in a real river. Children observing the natural downward flow of water learn about gravity and its effect on water flow. In addition, the various portions of the riverbed are at varying depths, allowing children to observe the effect of depth on the flow and path of water.

The molded sand-like textures 33 and rock-like shapes 22 along the riverbed 24 simulate natural occurrences and erosion in real riverbeds. By placing sand, stones and other natural materials in and along the riverbed, children can investigate the relationship between the amount/force of water and erosion. Another feature 35 is a dike which interrupts the water flow.

Another feature is an island 25 placed directly in the path of the water flow, allowing children to observe how the island interrupts and diverts the flow of water. Finally, raised surfaces simulate land 34, a mountain 27, and a waterfall 28, which flows over a set of boulders 29.

A series of outflow holes 30 allow water to drain into the container 10 below, thereby preventing overflow. Children can observe how the outflow holes 30 affect the flow of water and how water moves through the outflow holes 30. Moreover, the outflow holes 30 provide for constant drainage of the water, requiring continuing involvement of the child to maintain the flow of water. Furthermore, the outflow holes 30 are designed and position in such a way as to illustrate the power of water as it effects objects that are placed under the holes and in the path of the streams of returning water.

This embodiment also includes a filling tank 40 to catch water as it is poured into the apparatus. The filling tank 40 also aids in the prevention of overflow and splash back.

An outflow basin 50 located toward the bottom of the sloped riverbed accumulates water by action of gravity. A series of outflow holes 30 in the outflow basin allows the accumulated water to drain into the container 10 below. A backsplash channel 55 helps prevent backsplash. A back-sloped overflow channel 56 helps prevent overflow and demonstrates the course that water takes on a more steeply sloped surface.

In a second embodiment of the invention, as shown in FIG. 3, the container 10 can be attached to several interchangeable covers 61*a–d,* each incorporating a different integrally molded topographical feature or combination of topographical features. A child may thereby play with each topographical feature separately and investigate the phenomena and scientific principles associated with each such feature isolated from the effects of other topographical features.

Figure 4B:
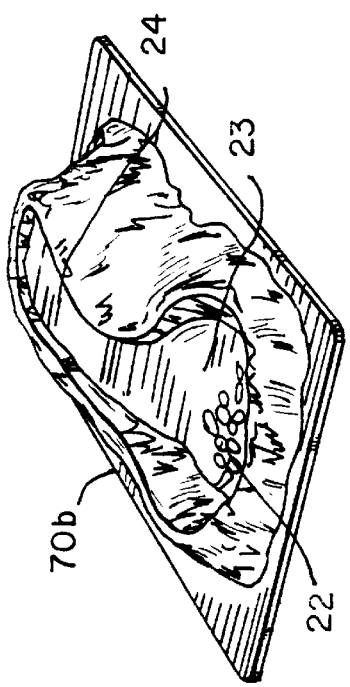
FIG. 4 is a top-plan view of various topographical features attachable to the cover.
Figure 4A:
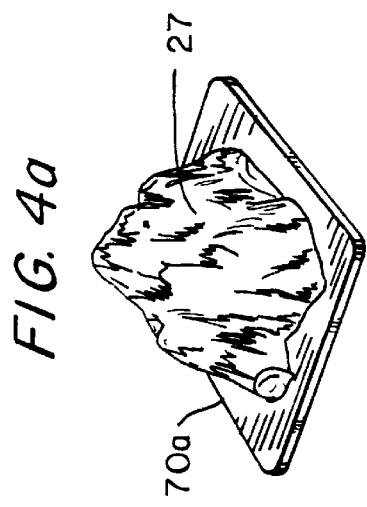
Figure 4C:
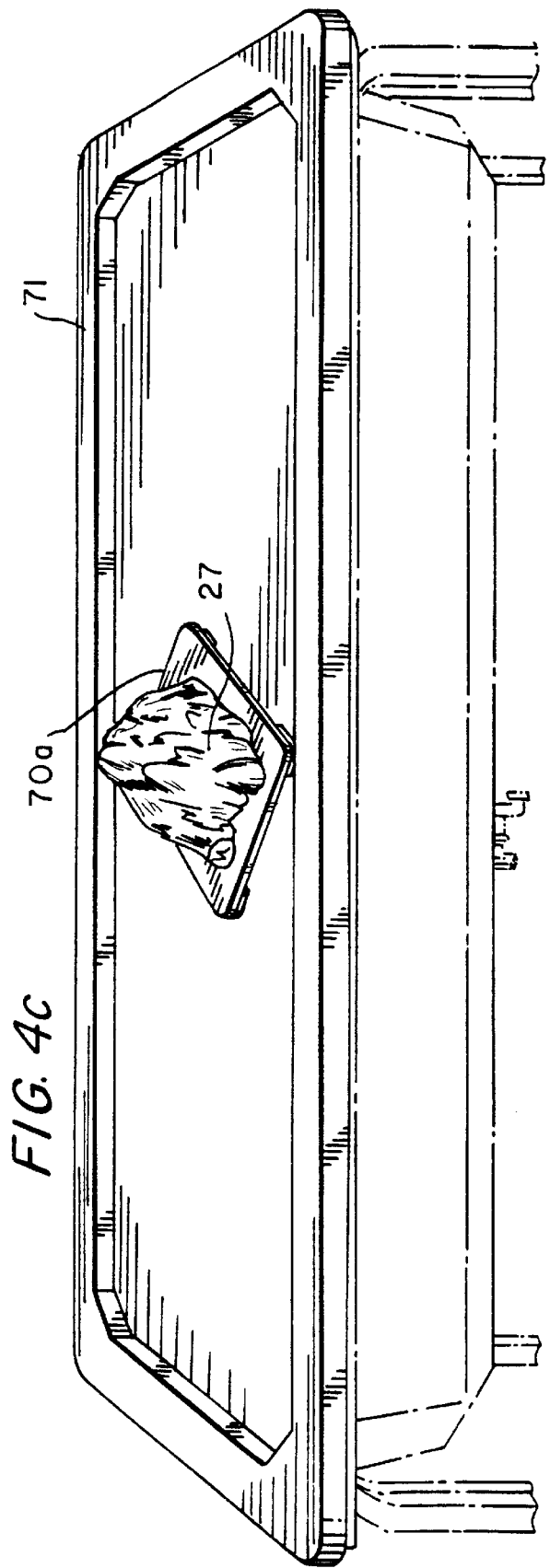

In yet another embodiment, as shown in FIG. 4, the topographical features 70*a–b* are separately molded and attachable to a plain cover 71 by means of fitted grooves, flanges, Velcro™ or the like. A child may thereby choose which topographical features will be incorporated during a particular play session, and may combine the features in different positions and/or orientations.

As shown in FIG. 5, the dikes 35 may be separately detachable as well. In addition, the detachable dikes 35*a–c* may vary in size and design. Children may experiment by substituting dikes of varying designs and sizes to learn how the size and/or shape of the dike affects water flow.

FIG. 5 also illustrates that the size of the outflow holes 30 can be adjusted to create varying drainage rates from a slow sprinkle to a rushing torrent. For example, if the diameter of the outflow holes is sufficiently small, the drainage rate will be slow, creating a so-called sprinkle drain 36. Alternatively, an outflow hole or plurality of outflow holes 30 can be sized and arranged to create other flow and drainage effects. For example, if the surrounding topography is sloped in an appropriate manner, an outflow hole of a particular size will cause the water to flow is a spiral pattern as it drains into the container 10 below, thereby creating a spiral drain 37.

While it is apparent that the preferred embodiments of the invention disclosed are well calculated to fulfill the objectives, benefits, and advantages of the invention, it will be appreciated that the invention is susceptible to modification, variation and change without departing from the proper scope or fair meaning of the subjoined claims.

I claim:

1. An educational sand and water table comprising:
   a container having sidewalls and a bottom; and
   a rigid cover detachably secured to said sidewalls, said cover having at least one topographical feature that retains or collects water.

2. An educational sand and water table comprising:
   a container having sidewalls and a bottom; and
   a rigid cover detachably secured to said sidewalls, said cover having at least one topographical feature selected from the group consisting of a riverbed, a raised land surface, an island, a dike, a whirlpool, a waterfall and a rock-like shape.

3. The sand and water table of claim 2 wherein said riverbed is sloped.

4. The sand and water table of claim 1 wherein said cover includes a channel integrally formed along three outer edges of said cover, such that said channel matingly engages said sidewalls.

5. The sand and water table of claim 1 wherein said cover is formed from ABS plastic.

6. The sand and water table of claim 1 wherein said topographical features are integrally molded on said cover.

7. The sand and water table of claim 1 wherein said topographical features are separately molded and reversibly attachable to said cover.

8. The sand and water table of claim 7 wherein said reversibly attachable topographical features are attached to said cover by fitted grooves, flanges or hook and loop fasteners.

9. The sand and water table of claim 7 wherein the molded topographical features are selected from the group consisting of a riverbed, a raised land surface, an island, a dike, a whirlpool, a waterfall and a rock-like shape.

10. An educational sand and water table comprising:
    a container having sidewalls and a bottom; and
    a rigid cover detachably secured to said sidewalls, said cover having at least one topographical feature that does not channel the flow of water solely to a drain hole.

11. The sand and water table of claims 1, 2, 3, 4, 5, 6, 7, 8 9 or 10 wherein said cover further includes a plurality of outflow holes to allow water to flow into said container.

12. The sand and water table of claim 11 further comprising a filling tank which drains into said cover.

13. The sand and water table of claim 11 wherein said cover further includes an outflow basin for accumulating water, said outflow basin having a plurality of outflow holes to allow water to flow into said container.

14. The sand and water table of claim 11 wherein said cover includes a backsloped overflow channel to prevent overflow.

15. The sand and water table of claim 11 further comprising a frame supporting said container and a plurality of legs extending from said frame.

16. The sand and water table of claim 15 wherein said frame and said legs are made from rust-resistant, enamel-coated, 1" square steel tubing.

17. The sand and water table of claim 16 further comprising at least one locking caster attached to at least one of said legs.

18. The sand and water table of claim 11 further comprising a drain incorporated into said container bottom.

19. The sand and water table of claim 18 wherein said drain comprises a faucet and faucet handle for controlling flow through said faucet.

\* \* \* \* \*